(12) United States Patent
Gonze et al.

(10) Patent No.: US 8,661,797 B2
(45) Date of Patent: Mar. 4, 2014

(54) $NO_x$ ADSORBER REGENERATION SYSTEM AND METHOD

(75) Inventors: Eugene V. Gonze, Pinckney, MI (US); Michael J. Paratore, Jr., Howell, MI (US); Joshua Clifford Bedford, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 246 days.

(21) Appl. No.: 12/946,203

(22) Filed: Nov. 15, 2010

(65) Prior Publication Data
US 2012/0117947 A1    May 17, 2012

(51) Int. Cl.
*F01N 3/10*    (2006.01)

(52) U.S. Cl.
USPC .................................. 60/303; 60/274; 60/307

(58) Field of Classification Search
USPC .......................................... 60/274, 303, 307
See application file for complete search history.

(56) References Cited

U.S. PATENT DOCUMENTS

| | | | | |
|---|---|---|---|---|
| 5,357,749 A | * | 10/1994 | Ohsuga et al. | 60/274 |
| 7,210,288 B2 | * | 5/2007 | Bandl-Konrad et al. | 60/297 |
| 2003/0093992 A1 | * | 5/2003 | Suga et al. | 60/285 |
| 2004/0040287 A1 | * | 3/2004 | Beutel et al. | 60/285 |
| 2005/0028518 A1 | * | 2/2005 | Li et al. | 60/300 |
| 2006/0021332 A1 | * | 2/2006 | Gaiser | 60/286 |
| 2006/0230748 A1 | * | 10/2006 | Dalla Betta et al. | 60/286 |
| 2007/0175208 A1 | | 8/2007 | Bandl-Konrad et al. | |
| 2008/0264036 A1 | * | 10/2008 | Bellovary | 60/274 |
| 2009/0199547 A1 | * | 8/2009 | Li et al. | 60/299 |
| 2009/0211232 A1 | * | 8/2009 | Huennekes et al. | 60/276 |
| 2009/0241522 A1 | * | 10/2009 | Dalla Betta et al. | 60/295 |
| 2010/0086458 A1 | * | 4/2010 | Kim et al. | 423/239.1 |
| 2010/0229533 A1 | * | 9/2010 | Li et al. | 60/274 |

OTHER PUBLICATIONS

Office Action regarding related CN App. No. 201110361021.2; dated Oct. 21, 2013; 8 pages.

* cited by examiner

*Primary Examiner* — Thomas Denion
*Assistant Examiner* — Jason Shanske
(74) *Attorney, Agent, or Firm* — Cantor Colburn LLP

(57) ABSTRACT

An exhaust gas after treatment system for an engine comprises an oxidation catalyst NOx adsorber wherein an oxidation catalyst compound and a $NO_x$ adsorber compound are disposed. A fuel injector is connected to and is in fluid communication with the oxidation catalyst NOx adsorber device for delivery of a hydrocarbon fuel thereto and an air pump is connected to and is in fluid communication with the oxidation catalyst NOx adsorber device for delivery of air thereto. The fuel injector and the air pump supply fuel and air to the oxidation catalyst NOx adsorber device for oxidation thereof and heating of the NOx adsorber compound to a $NO_x$ release temperature following shut down of the internal combustion engine.

10 Claims, 2 Drawing Sheets

NO$_x$ ADSORBER REGENERATION SYSTEM AND METHOD

FIELD OF THE INVENTION

Exemplary embodiments of the present invention relate to exhaust gas treatment systems for internal combustion engines and, more particularly, to a system and method for regenerating a NO$_x$ adsorber following engine shut off.

BACKGROUND

The exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("NO$_x$") as well as condensed phase materials (liquids and solids) that constitute particulate matter ("PM"). Catalyst compositions typically disposed on catalyst supports or substrates are provided in an engine's exhaust system to convert certain, or all of these exhaust constituents into non-regulated exhaust gas components.

A technology that has been developed to reduce the levels of NO emissions in lean-burn engines (ex. diesel engines) that burn fuel in excess oxygen includes a selective catalytic reduction ("SCR") device. The SCR catalyst composition preferably contains a zeolite and one or more base metal components such as iron ("Fe"), cobalt ("Co"), copper ("Cu") or vanadium which can operate efficiently to reduce NO constituents in the exhaust gas in the presence of a reductant such as ammonia ('NH$_3$"). Although the use of a catalyst aides in the reduction of activation energy required for the SCR device to operate, the ever increasing efficiency of diesel and other lean burn engines results in cooler exhaust temperatures when moderately operated and following engine start-up. Such cooler operating temperatures delay the operational start-up of the SCR device, which needs to reach a minimum operating temperature to effectively reduce NO$_x$. Typically, an SCR may not reach appropriate operating temperatures until several minutes after the engine is started. Such delay is no longer feasible in view of ever tightening motor vehicle emissions regulations. A primary contributor to slow catalyst light-off, besides the lower exhaust temperatures experienced, is the thermal mass of the engine and the exhaust system that extends between the engine and the SCR device. The thermal mass may include the engine, the engine exhaust manifold, an oxidation catalyst ("OC") device as well as the exhaust conduit.

A technology that may be used to assist in the control of emitted NO$_x$, during periods when the SCR device is heating to operational temperatures following a cold engine start, or when the SCR device cools below its operating temperature during light load operation, is a NO$_x$ adsorber device that traps and holds NO$_x$ constituents below temperatures at which the SCR device is operational. The NO$_x$ adsorber device is a passive device that includes an adsorbent coating that may comprise a temperature based zeolite NOx absorber compound or other suitable adsorbent compounds that collect and hold NO$_x$ constituents at low temperatures. As the exhaust system temperatures rise, the adsorbent compounds release the stored NO$_x$ constituents for conversion by the SCR device. A challenge when using passive NO$_x$ adsorber devices is to assure that the device is purged of stored NO$_x$ constituents when the engine is shut down so that the device will be ready to operate when the engine is restarted.

SUMMARY OF THE INVENTION

In an exemplary embodiment of the invention an exhaust gas after treatment system for an internal combustion engine comprises an exhaust gas conduit in fluid communication with, and configured to receive an exhaust gas from, the internal combustion engine. An oxidation catalyst NOx adsorber device has an inlet and an outlet in fluid communication with the exhaust gas conduit and an oxidation catalyst compound and a NO$_x$ adsorber compound are disposed in the oxidation catalyst NOx adsorber device. A fuel injector is connected to and is in fluid communication with the exhaust gas conduit upstream of the oxidation catalyst NOx adsorber device for delivery of a hydrocarbon fuel thereto and an air pump is connected to and is in fluid communication with the exhaust gas conduit upstream of the oxidation catalyst NOx adsorber device for delivery of air thereto. The fuel injector and the air pump supply fuel and air to the exhaust conduit and the oxidation catalyst NOx adsorber device.

In another exemplary embodiment of the invention, a method for operating an exhaust gas after treatment system for an internal combustion engine having an exhaust gas conduit in fluid communication with, and configured to receive an exhaust gas from, the internal combustion engine, an oxidation catalyst NOx adsorber device having an inlet and an outlet in fluid communication with the exhaust gas conduit, an oxidation catalyst compound disposed in the oxidation catalyst NOx adsorber device, a NO$_x$ adsorber compound disposed in the oxidation catalyst NOx adsorber device a fuel injector connected to and in fluid communication with the exhaust gas conduit upstream of the oxidation catalyst NOx adsorber device for delivery of a hydrocarbon fuel thereto an air pump connected to and in fluid communication with the exhaust gas conduit upstream of the oxidation catalyst NOx adsorber device for delivery of air thereto, a selective catalytic reduction device disposed downstream of the oxidation catalyst NOx adsorber device in fluid communication with exhaust gas conduit and the oxidation catalyst NOx adsorber device and a selective catalytic reduction catalyst composition in the selective catalytic reduction device to reduce NO$_x$ constituents released from the oxidation catalyst NOx adsorber device comprises determining the internal combustion engine is in a shutdown state, monitoring the temperature of the NOx adsorber compound, activating the fuel injector to inject fuel into the exhaust gas conduit and activating the air pump to mix with and carry the injected fuel to the oxidation catalyst NOx adsorber device when the temperature of the NOx adsorber compound is below the NO$_x$ release temperature and, deactivating the fuel injector and the air pump when the temperature of the NO$_x$ adsorber compound is at or above the NO$_x$ release temperature.

The above features and advantages, and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of the embodiments, the detailed description referring to the drawings in which.

DESCRIPTION OF THE EMBODIMENTS

Figure 1:
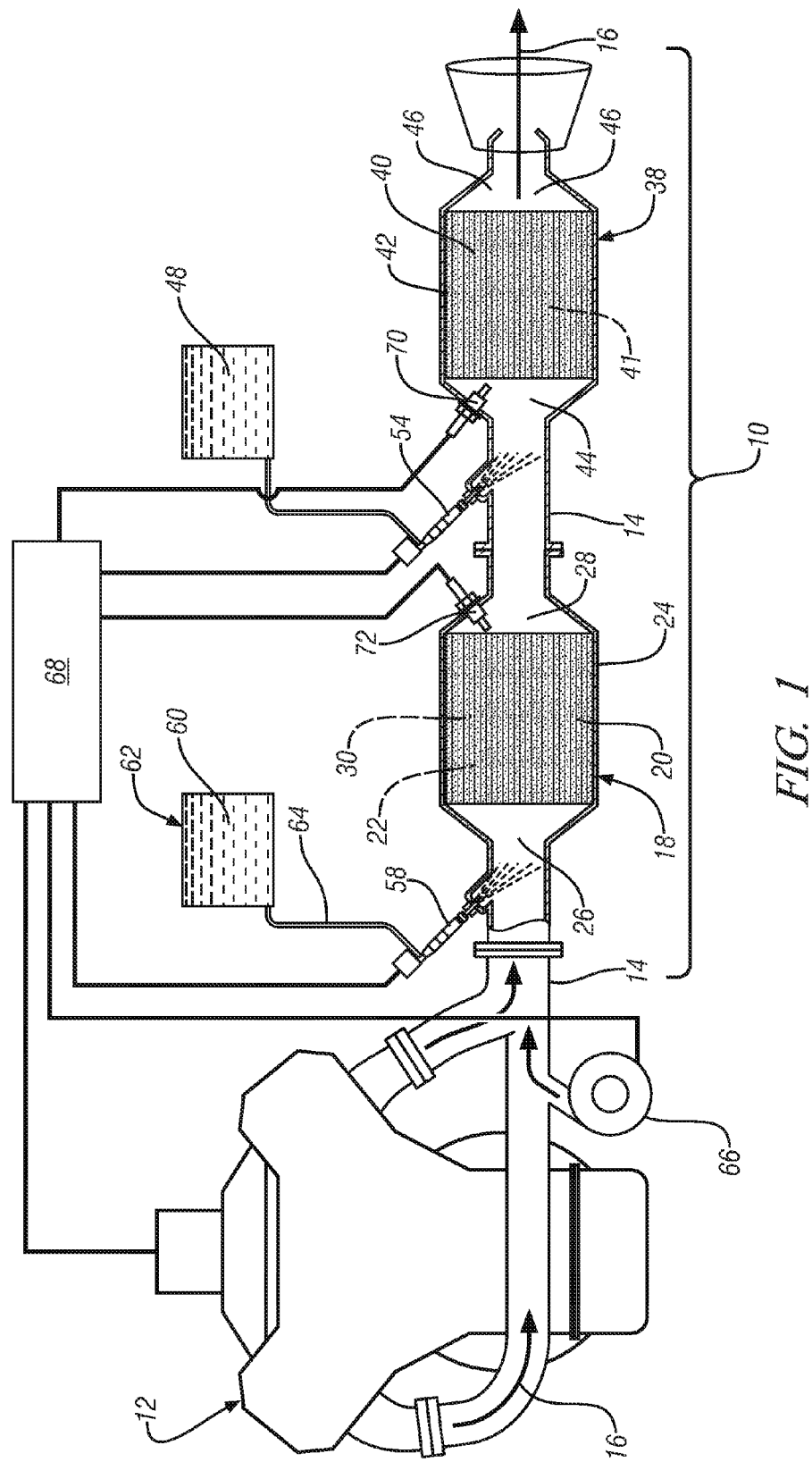
FIG. 1 is a schematic view of an exhaust gas treatment system for an internal combustion engine.

The following description is merely exemplary in nature and is not intended to limit the present disclosure, its application or uses. It should be understood that throughout the drawings, corresponding reference numerals indicate like or corresponding parts and features.

Referring now to FIG. 1, an exemplary embodiment of the invention is directed to an exhaust gas treatment system 10, for the reduction of regulated exhaust gas constituents of an internal combustion engine 12. It is appreciated that the internal combustion engine 12 may include, but is not limited to diesel engine systems, gasoline direct injection engine systems and homogeneous charge compression ignition engine systems.

The exhaust gas treatment system includes an exhaust gas conduit 14, which may comprise several segments that function to transport exhaust gas 16 from the internal combustion engine 12 to the various exhaust treatment devices of the exhaust gas treatment system 10. The exhaust treatment devices may include an Oxidation Catalyst $NO_x$ adsorber ("OCN") device 18. In an exemplary embodiment, the OCN device 18 includes a flow-through metal or ceramic monolith substrate 20 ("substrate") that is packaged in a rigid shell or canister 24 between an inlet 26 and an outlet 28 that are in fluid communication with exhaust gas conduit 14 and are configured to facilitate the flow of exhaust gas 16 therethrough. The substrate 20 has an oxidation catalyst compound 22 disposed thereon. The oxidation catalyst compound may be applied as a wash coat and may contain platinum group metals such as platinum (Pt), palladium (Pd), rhodium (Rh) or other suitable oxidizing catalysts, or combination thereof. The OCN device 18 is useful in treating unburned gaseous and non-volatile HC and CO emitted from the engine 12 as part of the exhaust gas 16 which are oxidized to form carbon dioxide and water.

In an exemplary embodiment, the substrate 20 may also include a $NO_x$ adsorber compound 30 disposed thereon. The $NO_x$ adsorber compound 30 may be applied as a wash coat and may contain a zeolite NOx adsorber compound or other suitable $NO_x$ adsorber compounds that function to adsorb and store $NO_x$ constituents present in the exhaust gas 16 below selected exhaust gas temperatures. As a result the OCN device 18 is useful in treating unburned gaseous and non-volatile HC and CO emitted from the engine 12 as part of the exhaust gas 16 by oxidizing to form carbon dioxide and water as well as adsorbing and storing $NO_x$ constituents. In another embodiment, the $NO_x$ adsorber may be applied to a separate substrate (not shown) that is supported in the same canister 24 or in a separate canister (not shown), downstream of the oxidation catalyst compound 22.

In an exemplary embodiment, a Selective Catalytic Reduction ("SCR") device 38 is disposed downstream of the OCD device 18. In a manner similar to the OCD device, the SCR device 38 may include a flow-through ceramic or metal monolith substrate ("substrate") 40 that is packaged in a rigid shell or canister 42 having an inlet 44 and an outlet 46 in fluid communication with exhaust gas conduit 14 and configured to facilitate the flow of exhaust gas 16 therethrough. The substrate 40 has an SCR catalyst composition 41 applied thereto. The SCR catalyst composition preferably contains a zeolite and one or more base metal components such as iron ("Fe"), cobalt ("Co"), copper ("Cu") or vanadium which can operate efficiently to reduce $NO_x$ constituents in the exhaust gas 16 in the presence of a reductant 48 such as ammonia ('$NH_3$") that is injected, via reductant injector 54, into the exhaust gas treatment system upstream of the SCR device 38 when the temperature of the device is in the range of 200° C. and above. When operating temperatures of the SCR device 38 are below the active operating temperature of the SCR catalyst composition 41 of the SCR device 38, $NO_x$ constituents in the exhaust gas 16 are adsorbed by the $NO_x$ adsorber compound 30 in the OCN device 18.

In an exemplary embodiment, disposed upstream of the OCN device 18, in fluid communication with the exhaust gas 16 in the exhaust gas conduit 14, is a hydrocarbon delivery system configured to deliver hydrocarbons upstream of the oxidation catalyst. In the exemplary embodiment illustrated in FIG. 1, the reductant delivery system is an HC or fuel injector 58. The fuel injector 58, in fluid communication with fuel 60 in fuel supply tank 62 through fuel conduit 64, is configured to introduce unburned, hydrocarbon containing fuel 60 into the exhaust gas conduit 14 for delivery to the OCN device 18.

In an exemplary embodiment, located upstream of the OCN device 18, in fluid communication with the exhaust gas conduit 14, is an air pump 66 that is configured to supply air to the exhaust gas conduit 14 of the exhaust gas treatment system 10.

A controller such as a powertrain or a vehicle controller 68 is operably connected to, and monitors, the exhaust gas treatment system 10 through signal communication with a number of sensors such as temperature sensor 70 which monitors the temperature near the inlet 44 of the SCR device 38 and temperature sensor 72 which monitors the temperature near the outlet 28 of the OCN device 18. Based on various measured parameters including those from temperature sensors 70 and 72, the controller 68 is configured to operate the fuel injector 58 to supply fuel 60 to the exhaust gas conduit 14 as well as to operate the air pump 66 to supply air to the exhaust gas 16 in the exhaust gas conduit 14. As used herein the term controller may include an application specific integrated circuit (ASIC), an electronic circuit, a processor (shared, dedicated or group) and memory that executes one or more software or firmware programs, a combinational logic circuit, and/or other suitable components that provide the described functionality.

Figure 2:
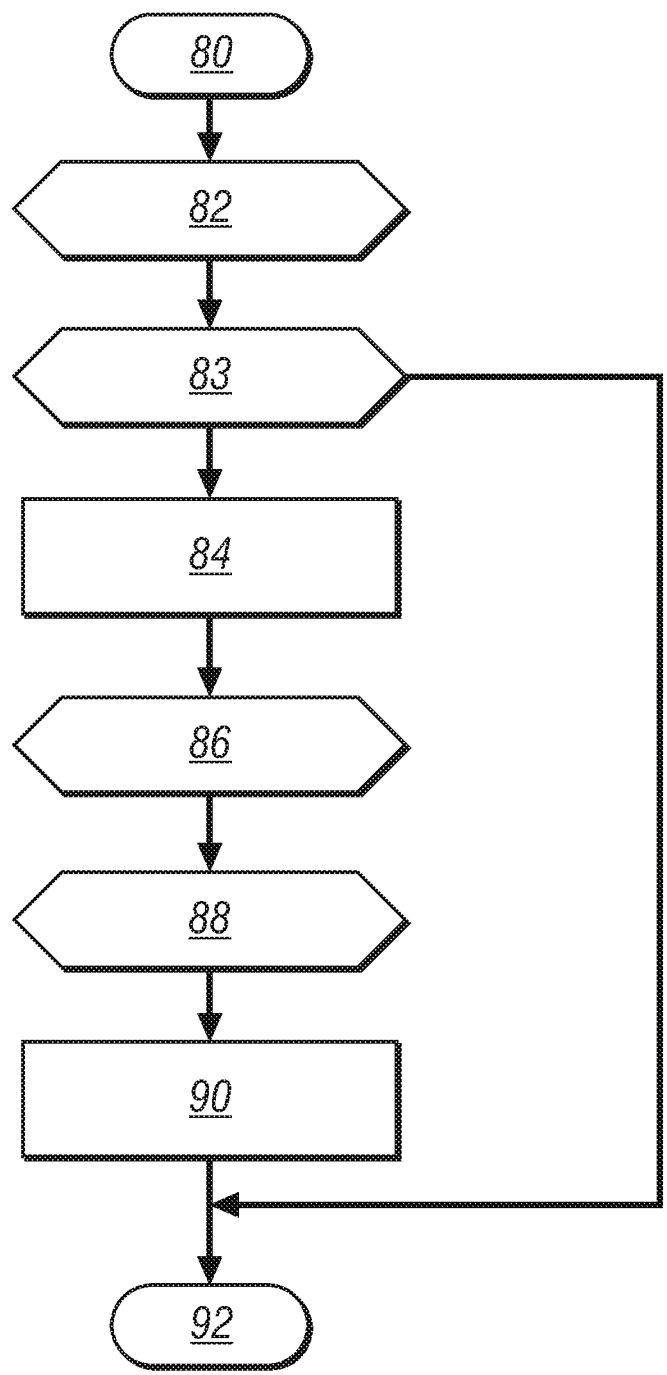
FIG. 2 is an operational diagram illustrating an operating mode of a portion of the exhaust gas treatment system embodying aspects of the present invention.

With reference to FIG. 2, an exemplary embodiment of the operation of a portion of the exhaust after treatment system 10 is illustrated. The operation starts at 80 and runs following a shut down state 82 of the internal combustion engine 12. In another exemplary embodiment, the operation may run continuously during operation of the internal combustion engine 12. The controller 68 monitors at 83, through temperature sensor 72, the temperature of the OCN device 18 to determine if the temperature is at a level (about 300° C. or above) at which the $NO_x$ adsorber compound is not being adsorbed and stored in the OCN device; referred to as the $NO_x$ release temperature. If the controller 68 determines at 83 (determine NOx storage threshold) that the temperature is less than required for $NO_x$ release it will activate the fuel injector 58 to inject fuel 60 into the exhaust gas conduit 14 and the air pump 66 to mix with and carry the injected fuel 60 to the OCN device 18 at 84. If the temperature is greater than that required for $NO_x$ release the operation may end at 92. The injected fuel 60 and air will oxidize when it passes OCN device 18 and will rapidly heat the $NO_x$ adsorber compound 30 to a temperature that will allow it to release stored $NO_x$ constituents therefrom at 86. The released $NO_x$ constituents will flow downstream from the OCN device 18 to the SCR device 38, which is still at an operational temperature and saturated with $NH_3$ reductant following engine shutdown. The $NO_x$ constituents will be reduced to unregulated exhaust gas constituents in the SCR device prior to exiting the exhaust gas treatment system 10. When the $NO_x$ constituent storage is determined by the controller 68 to be suitable for adsorption at 88 (determined by the time at or above the $NO_x$ release temperature), the controller 68 will deactivate the air pump 66 and the fuel injector

58 at 90 and the operation will end at 92. The OCN device 18 is now purged of stored $NO_x$ and is prepared for rapid adsorption of $NO_x$ constituents following the next engine 12 cold start.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust gas after treatment system for an internal combustion engine comprising:
   an exhaust gas conduit in fluid communication with, and configured to receive an exhaust gas from, the internal combustion engine;
   an oxidation catalyst NOx adsorber device having an inlet and an outlet in fluid communication with the exhaust gas conduit;
   an oxidation catalyst compound disposed in the oxidation catalyst NOx adsorber device;
   a NOx adsorber compound disposed in the oxidation catalyst NOx adsorber device for storage and release of NOx constituents in the exhaust gas;
   a hydrocarbon delivery system connected to and in fluid communication with the exhaust gas conduit upstream of the oxidation catalyst NOx adsorber device for delivery of a hydrocarbon fuel thereto;
   an air pump connected to and in fluid communication with the exhaust gas conduit upstream of the oxidation catalyst NOx adsorber device for delivery of air thereto, wherein the hydrocarbon delivery system and the air pump supply fuel and air to the exhaust conduit and the oxidation catalyst NOx adsorber device;
   a selective catalytic reduction device disposed downstream of the oxidation catalyst NOx adsorber device in fluid communication with exhaust gas conduit and the oxidation catalyst NOx adsorber device;
   a selective catalytic reduction catalyst composition in the selective catalytic reduction device; and
   a controller in signal communication with the internal combustion engine, the exhaust gas treatment system, the reductant delivery system and the air pump and configured to operate the reductant delivery system and the air pump following a shut down of the internal combustion engine.

2. The exhaust gas after treatment system of claim 1, wherein the oxidation catalyst NOx adsorber device further comprises at least one flow through substrate having the oxidation catalyst compound and the $NO_x$ adsorber compound applied thereon.

3. The exhaust gas after treatment system of claim 1, wherein the selective catalytic reduction device further comprises at least one flow through substrate having the selective catalytic reduction catalyst composition applied thereon.

4. The exhaust gas after treatment system of claim 1, wherein the hydrocarbon delivery system comprises a fuel injector.

5. The exhaust gas after treatment system of claim 1, wherein the oxidation catalyst compound includes a platinum group metal selected from the group of platinum (Pt), palladium (Pd), rhodium (Rh) or other suitable oxidizing catalysts, or combination thereof.

6. The exhaust gas after treatment system of claim 1, wherein the NOx adsorber compound includes a zeolite NOx adsorber compound.

7. The exhaust gas after treatment system of claim 1, wherein the selective catalytic reduction catalyst composition includes a zeolite and a base metal component comprising iron ("Fe"), cobalt ("Co"), copper ("Cu") or vanadium, or a combination thereof.

8. An exhaust gas after treatment system for an internal combustion engine comprising:
   an exhaust gas conduit in fluid communication with, and configured to receive an exhaust gas from, the internal combustion engine;
   an oxidation catalyst NOx adsorber device having an inlet and an outlet in fluid communication with the exhaust gas conduit;
   an oxidation catalyst compound disposed in the oxidation catalyst NOx adsorber device;
   a NOx adsorber compound disposed in the oxidation catalyst NOx adsorber device for storage and release of NOx constituents in the exhaust gas;
   a fuel injector connected to and in fluid communication with the exhaust gas conduit upstream of the oxidation catalyst NOx adsorber device for delivery of a hydrocarbon fuel thereto;
   an air pump connected to and in fluid communication with the exhaust gas conduit upstream of the oxidation catalyst NOx adsorber device for delivery of air thereto, wherein the fuel injector and the air pump supply fuel and air to the exhaust conduit and the oxidation catalyst NOx adsorber device;
   a selective catalytic reduction device disposed downstream of the oxidation catalyst NOx adsorber device in fluid communication with exhaust gas conduit and the oxidation catalyst NOx adsorber device;
   a selective catalytic reduction catalyst composition in the selective catalytic reduction device to reduce the NOx constituents released from the oxidation catalyst NOx adsorber device; and
   a controller in signal communication with the internal combustion engine, the exhaust gas treatment system, the reductant delivery system and the air pump and configured to operate the reductant delivery system and the air pump following a shut down of the internal combustion engine.

9. A method for operating an exhaust gas after treatment system for an internal combustion engine having an exhaust gas conduit in fluid communication with, and configured to receive an exhaust gas from, the internal combustion engine, an oxidation catalyst NOx adsorber device having an inlet and an outlet in fluid communication with the exhaust gas conduit, an oxidation catalyst compound disposed in the oxidation catalyst NOx adsorber device, a NOx adsorber compound disposed in the oxidation catalyst NOx adsorber device for storing and releasing NOx constituents, a hydrocarbon delivery system connected to and in fluid communication with the exhaust gas conduit upstream of the oxidation catalyst NOx adsorber device for delivery of a hydrocarbon fuel thereto, an air pump connected to and in fluid communication with the exhaust gas conduit upstream of the oxidation catalyst NOx adsorber device for delivery of air thereto, a selective catalytic reduction device disposed downstream of the oxidation catalyst NOx adsorber device in fluid communication with exhaust gas conduit and the oxidation catalyst NOx adsorber device and a selective catalytic reduction catalyst composition in the selective catalytic reduction device to reduce NOx constituents released from the oxidation catalyst NOx adsorber device comprising:

determining the internal combustion engine is in a shut down state;

monitoring the temperature of the NOx adsorber compound;

after determining the internal combustion engine is in a shut down state, activating the hydrocarbon delivery system to deliver fuel into the exhaust gas conduit and activating the air pump to mix with and carry the injected fuel to the oxidation catalyst NOx adsorber device when the temperature of the NOx adsorber compound is below the NOx release temperature; and deactivating the hydrocarbon delivery system and the air pump when the temperature of the NOx adsorber compound is at or above the NOx release temperature.

10. The method of claim 9, wherein said monitoring of the temperature of the NOx adsorber includes measuring the temperature in the exhaust gas conduit downstream of the oxidation catalyst NOx adsorber device.

\* \* \* \* \*